United States Patent
Gershon et al.

(12) 
(10) Patent No.: US 6,563,830 B1
(45) Date of Patent: May 13, 2003

(54) MULTICAST REGISTRATION OF ALL MULTICAST FLOWS IN AN ASYNCHRONOUS TRANSFER MODE BASED EMULATED LAN

(75) Inventors: Benny Gershon, Rehovot (IL); Lior Katzri, Givaataim (IL); Yuri Shwartsburd, Or Akiva (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/537,038

(22) Filed: Mar. 28, 2000

(51) Int. Cl.[7] ............................................. H04L 12/28
(52) U.S. Cl. ................................................ 370/395.53
(58) Field of Search ............................ 370/395.53, 401

(56) References Cited

U.S. PATENT DOCUMENTS

| | | | |
|---|---|---|---|
| 5,835,481 A | * 11/1998 | Akyol et al. | 370/395.53 |
| 5,946,311 A | * 8/1999 | Alexander, Jr. et al. | 370/395 |
| 5,949,753 A | * 9/1999 | Alexander, Jr. et al. | 370/216 |
| 6,137,799 A | * 10/2000 | Karapetkov et al. | 370/395.53 |
| 6,226,297 B1 | * 5/2001 | Alexander et al. | 370/401 |
| 6,493,345 B1 | * 12/2002 | Margulis et al. | 370/395.53 |

OTHER PUBLICATIONS

Kiiskila Marko; Implementation of LAN Emulation Over ATM in Linux; Master of Science thesis; pp. 1–50; Aug. 1996.*

ATM Practical Implementations Here and Now, 3COM Corporation, 1996.

CISCO IOS Switching Services Configuration Guide, Lan Emulation Overview, pp. XC–59–65.

LAN Emulation Over ATM Version 2–LUNI Specification–Letter Ballot, AF–LANE–0084.000, pp. 25–26, 29–33, 88–101.

LAN Emulation Over ATM, 1996, pp. 1–11.

* cited by examiner

*Primary Examiner*—Kenneth R. Coulter
(74) *Attorney, Agent, or Firm*—Howard Zaretsky; Paul J. Sutton (57) ABSTRACT

An apparatus for and a method of implementing multicast registration in an ATM based ELAN. The present invention provides a mechanism for a LEC to register to receive all multicast group traffic flows without requiring the LEC to generate a separate request for each multicast MAC address. The mechanism of the present invention provides means for a LEC to register to receive all multicast flows by defining an 'all_multicast' TLV and including this TLV in the LE_REGISTER_REQUEST request message sent by the LEC. The LEC, LES and SMS are modified to perform the multicast registration/unregistration method of the present invention. The LEC generates the LE_REGISTER_REQUEST message and includes the all_multicast TLV indicating that the LEC desires to receive all multicast traffic flows in the ELAN. The LES, upon receipt of such an all_multicast TLV, adds the LEC to its list of LECs to receive all multicast traffic and communicates the related information to the SMS. The SMS is adapted to add the LEC to each of the multicast groups currently maintained by the SMS. A similar symmetric process occurs in the event a LEC wishes to stop receiving all multicast traffic.

28 Claims, 6 Drawing Sheets

FIG.7

MULTICAST REGISTRATION OF ALL MULTICAST FLOWS IN AN ASYNCHRONOUS TRANSFER MODE BASED EMULATED LAN

FIELD OF THE INVENTION

The present invention relates generally to data communications networks and more particularly relates to an apparatus for and method of multicast registration in an Asynchronous Transfer Mode (ATM) based Emulated LAN (ELAN).

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) that is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as the Interim Inter-Switch Signaling Protocol (IISP). The goal of the PNNI specifications is to provide customers of ATM network equipment some level of multivendor interoperability.

LAN Emulation

Today, most data traffic in existing customer premises networks travels over legacy LANs. It is desirable to permit these legacy LANs and their embedded infrastructure to operate with new ATM networks currently being deployed. To enable an easier migration path to ATM, the ATM Forum has defined the LAN Emulation (LANE) specification that allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Figure 1:
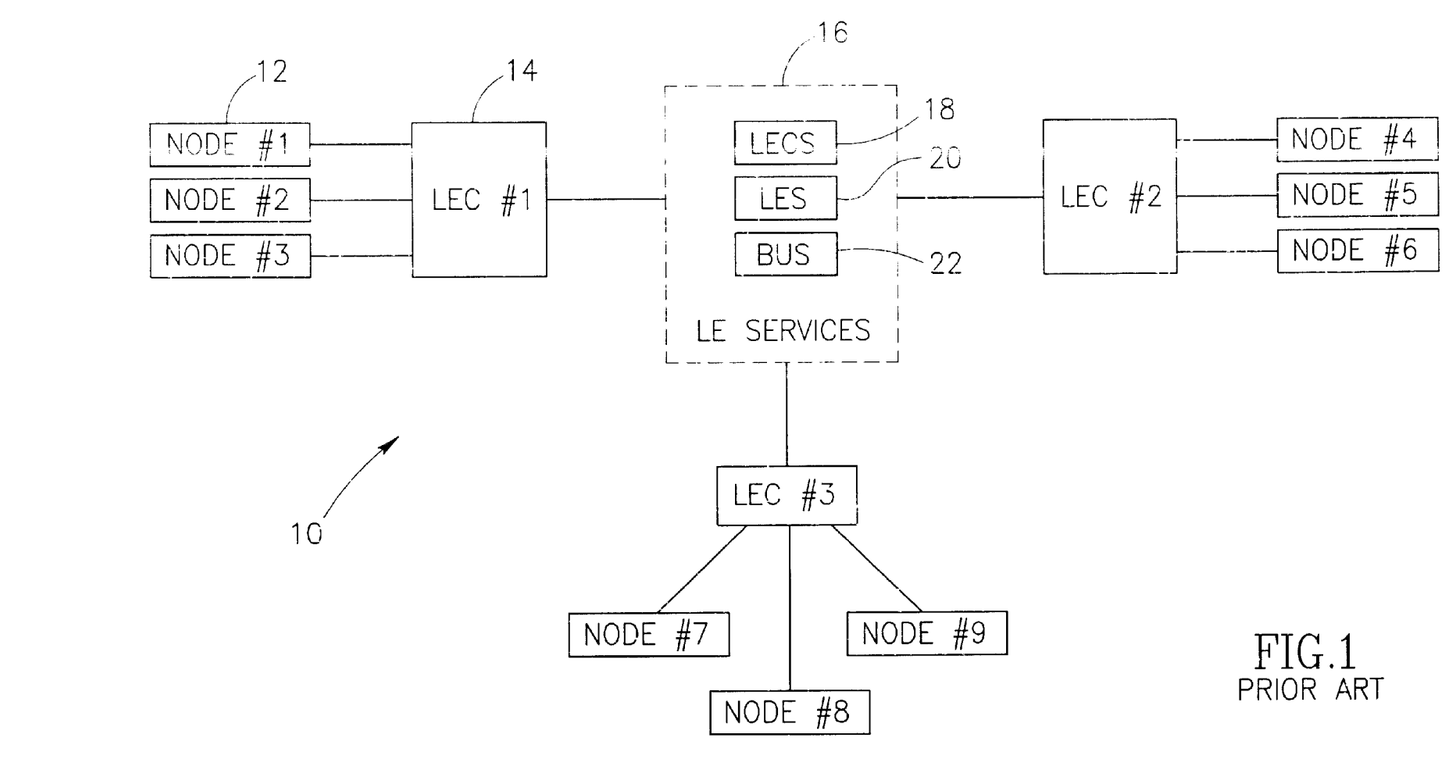
FIG. 1 is a block diagram illustrating prior art Version 1.0 LAN Emulation services available to nodes in an ATM network.

The ATM Forum's LANE standard entitled, "LAN Emulation over ATM Networks," Versions 1.0 and 2.0, incorporated herein by reference in its entirety, defines the LANE architecture and a set of protocols used by the LANE entities. LANE uses a client/server model to provide its services. A block diagram illustrating prior art Version 1.0 LAN Emulation services available to nodes in an ATM network is shown in FIG. 1. The network, generally referenced 10, comprises an ATM network cloud (not shown) which includes a plurality of LECs 14 labeled LEC #1 through LEC #3 and a plurality of nodes 12 labeled node #1 through node #9 connected to LECs #1 through #3. The LECs are connected to a LAN Emulation services block 16 that comprises LECS 18, LES 20 and BUS 22.

The entities defined by the LANE architecture include LAN Emulation Clients (LECs) 14, a LAN Emulation Server (LES) 20, a Broadcast and Unknown Server (BUS) 22 and LAN Emulation Configuration Server (LECS) 18. The LES, BUS and LECS constitute what is known to as the LANE Service (block 16).

Each LAN Emulation Client (LEC) represents a set of users, as identified by their MAC addresses. A LEC emulates a LAN interface that communicates with higher layer protocols such as IP, IPX, etc. that are used by these users. To achieve this task, the LEC communicates with the LANE Services and with other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as is typically the case, may use the well-known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LES implements the control coordination function for the ELAN by providing a mechanism for registering and resolving unicast and multicast MAC addresses to ATM addresses. An LEC is connected to only one LES entity and may register LAN destinations it represents and multicast MAC addresses it wishes to receive. A LEC also queries its LES when the LEC needs to resolve a MAC address to an ATM address. The LES either responds directly to the LEC or forwards the query to other LECs so they may respond.

The BUS functions to sequence and distribute data sent by LECs to the broadcast MAC address 'FFFFFFFFFFFF', multicast data (to provide the connectionless data delivery characteristics of a shared network) and unicast data sent by a LEC before a data direct VCC has been established. Note that a given BUS serves only one emulated LAN. The main functions of the BUS include distributing data with multicast MAC (MMAC) addresses, initial unicast data (where the MAC address has not yet been resolved to a direct ATM connection) and to distribute broadcast data.

In operation, all LECs send data frames to the BUS entity, which is operative to serialize the frames and re-transmit them directly, or indirectly to other LECs. Note that serialization is necessary in order to prevent the cells making up the AAL5 frames originating from different sources from being interleaved. The BUS entity participates in the LE Address Resolution Protocol (LE_ARP) to enable an LEC to locate its BUS. The BUS must also handle ATM connections and manage its distribution group.

Note that the BUS entity may have multiple interfaces which support receiving and forwarding of specific multicast MAC address frames over multiple VCCs. A LEC does not need to receive all multicast MAC address frames and it may inform the LES during initialization (in LANE Version 2.0 discussed below). The LES then selectively forwards multicast MAC addresses frames to only those LECs that have requested them.

In sum, all broadcast multicast and unknown traffic to and from a LEC passes through the BUS entity. Therefore, if the processing capabilities of the BUS are limited, a potential bottleneck may arise that severely affects the performance of the network.

The LECS contains the database used in determining the emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LEC's physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

The LES implements the control coordination function for the ELAN. The LESs provide a facility for registering and resolving unicast and multicast MAC addresses to ATM addresses. A LEC is connected to only one LES and may register LAN destinations it represents and multicast MAC addresses it wished to receive with its LES. A LEC will also query its LES when the LEC wishes to resolve a MAC address to an ATM address. The LES either responds directly to the LEC or forwards the query to other LECs so they may respond.

Figure 2:
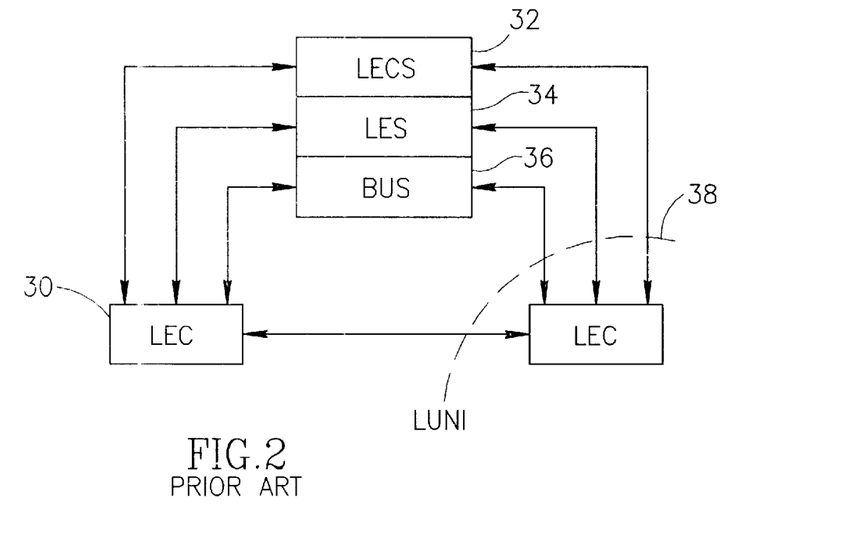
FIG. 2 is a block diagram illustrating the relationship between LEC, LECS, LES and BUS entities in prior art Version 1.0 LAN Emulation services.

A block diagram illustrating the relationship between LEC, LECS, LES and BUS entities in prior art Version 1.0 LAN Emulation services is shown in FIG. 2. Two LECs 30 are shown in communication with each other in addition to an LECS 32, LES 34 and BUS 36. The protocol the LECs use to communicate with each other and to the LAN Emulation services is known as LAN Emulation User to Network Interface (LUNI). The scope of the LUNI is indicated by the dashed line 38.

A characteristic feature of these types of implementations, however, is that when a LES fails, all the LECs connected to it try to rejoin the emulated LAN by connecting to the LECS. The LECS, however, assigns these LECs to the same non operative LES. The connection fails and the process continues endlessly.

The ATM Forum LAN Emulation Over ATM Version 2.0—LUNI Specification (af-lane-0084.000) addresses the single point of failure problem for the ELAN by defining a distributed architecture for the LANE services. Since the clients (LECs) should be effected by the particular implementation used to provide the services, the ATM Forum split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc. In addition, LNNI defines a new LAN Emulation Service entity, i.e., the Selective Multicast Server (SMS), to enhance the handling of Multicast traffic.

Figure 3:
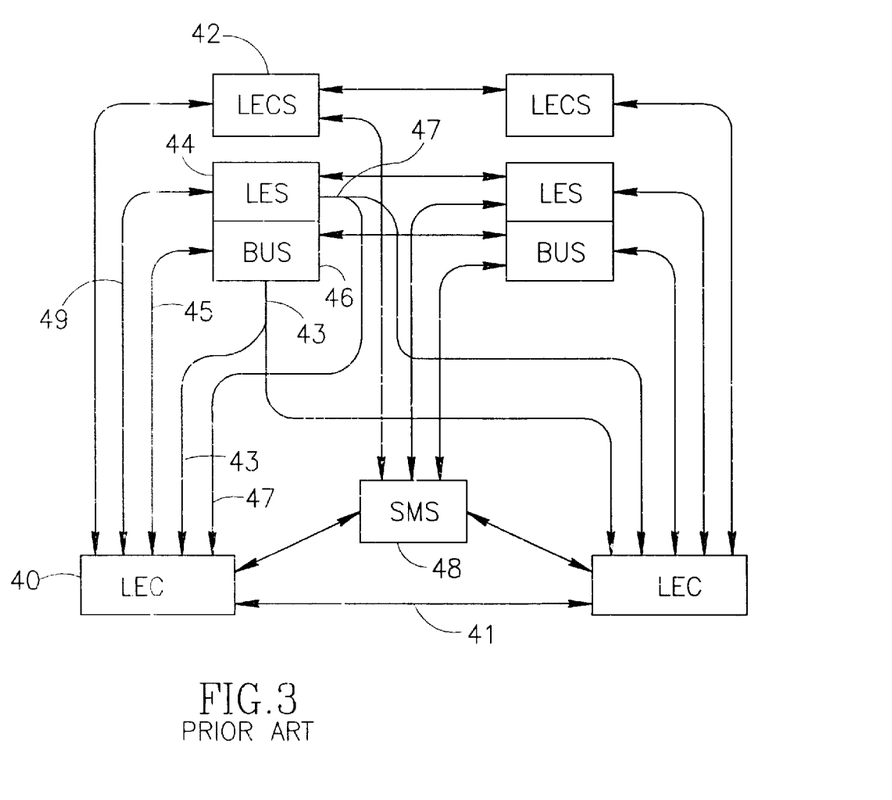
FIG. 3 is a block diagram illustrating the relationship between LEC, LECS, LES, BUS and SMS entities in prior art Version 2.0 LAN Emulation services.

A block diagram illustrating the relationship between LEC, LECS, LES, BUS and SMS entities in prior art Version 2.0 LAN Emulation services is shown in FIG. 3. Two LECs 40 are shown in communication with each other and to either of two LECS 42, LES 44 and BUS 46. In addition, both LECs and the LECS, LES and BUS communicate with a Selective Multicast Server (SMS) entity 48. Note that there can be more than one SMS per ELAN.

Communications among LANE components is normally handled via several types of SVCs, i.e., unidirectional, bidirectional, point-to-point (P2P) and point-to-multipoint (P2M), also known as VCCs. The LES communicates with each individual LEC via a control direct VCC 49 and with all LECs collectively via control distribute VCC 47; the BUS communicates with each individual LEC via a multicast send VCC 45 and with all LECs collectively via multicast forward VCC 43; and two individual LECs communicate with each other via a data direct VCC 41.

A brief description of the process normally performed to enable a LEC will now be presented. Initially, the LEC sends a configuration request message to the LECS to request to join an ELAN and obtain the ATM address of the LES for its ELAN. The message is sent over a bidirectional P2P Configure Direct VCC to the LECS. Using the same VCC, the LECS returns, via a configuration response message, the ATM address and the name of the LES for the ELAN associated with the LEC.

The LEC then sets up a bidirectional P2P Control Direct VCC to the LES associated with its ELAN for the purpose of exchanging control traffic. Once a Control Direct VCC is established between a LEC and LES, it remains up. The LEC then attempts to join the ELAN via join request and response messages to and from the LES. The LES for the ELAN sets up a bidirectional P2P Configure Direct VCC to the LECS to verify that the client is permitted to join the ELAN. The configuration request from the LES contains the MAC address of the LEC, its ATM address and the name of the ELAN. The LECS checks its database and determines if the LEC can join that particular ELAN. It uses the same VCC to reply to the LES whether the LEC is or is not permitted to join.

If the join is permitted, the LES adds the LEC to the unidirectional P2M Control Distribute VCC and confirms the join over the bidirectional P2P Control Direct VCC. If not permitted, the LES rejects the join over the bidirectional P2P Control Direct VCC. The LES sends configuration data, e.g., LEC_ID, ELAN_ID, etc., to the LEC. The LEC then sends LE_ARP packets for the broadcast address that causes VCCs to be set up between the LEC and the BUS entity.

During communications on the ELAN, each LEC builds a local LE_ARP table that maps MAC addresses to ATM addresses. When a LEC first joins an ELAN, its LE_ARP table does not contain any entries and it has no information about destinations on or behind its ELAN. The LEC uses the LE_ARP process to learn about the destination when a packet is to be transmitted, i.e., to find the ATM address corresponding to the known MAC address.

The LEC first sends an LE_ARP request to the LES over the Control Direct VCC. The LES forwards the LE_ARP request to all the LECs on the ELAN over the Control Distribute VCC. Any LEC that recognizes the MAC address responds with its ATM address over the Control Direct VCC. The LES forwards the response over the Control Distribute VCC. The LEC, upon receipt, adds the MAC address/ATM address pair to its LE_ARP cache. The LEC is then able to establish a Data Direct VCC to the desired destination and begin sending packets to the ATM address.

When a LEC wants to transmit broadcast, multicast or unicast traffic with an unknown address, it first sends the packet to the BUS over the Multicast Send VCC. The BUS forwards, i.e., floods, the packet to all LECs over the Multicast Forward VCC. Note that this VCC branches at each ATM switch. The switch is operative to forward the packets to multiple outputs.

Note that in connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

As described above, in the LANE Version 1.0 architecture (see FIGS. 1 and 2), the BUS is responsible for handling three type of traffic: broadcast, multicast and unknown unicast. The multicast traffic is generated by one or more applications that send their data to a group of receivers. The group of receivers does not include all the clients of the ELAN. For example, these applications include but are not limited to video broadcasting, distribution of data information, e.g., software distribution or push technology, video conferencing, remote learning, etc.

It is expected that these applications will increase in popularity in the near future. Therefore, the amount of multicast traffic is expected to also increase to a large extent. If multicast traffic were to grow, based on the LANE Version 1.0 implementation, the BUS would quickly become a bottleneck for traffic when the total amount of multicast traffic on the ELAN exceeds the forwarding power of the BUS.

Note that it is expected that in the near future Multicast traffic will become very heavy in networks. Broadcast traffic occurs mainly in the startup phase of the network and network elements. Once operating, little continuous broadcast traffic is generated. Similarly, unknown traffic is also not generated on a continuous basis. Unknown traffic is generated, for example, by a network element before a direct connection is established between two network devices.

In addition, multicast traffic is currently handled as broadcast traffic. All multicast traffic defaults to the BUS. In other words, regardless of the size and membership of the multicast group, a multicast message is broadcast to all the LECs and all members attached to the LECs.

To summarize, the disadvantage of LANE Version 1.0 is (1) the lack of true multicast capability (multicast is treated as broadcast) and (2) the lack of redundancy (if a LES or BUS fails the entire ELAN goes down). In particular, multicast traffic is limited by the forwarding capability of the BUS and by the slowest downlink to a LEC. Further, in switched edge device, all multicast traffic is distributed to all the ports.

Since, however, up till now relatively little multicast traffic was generated, the redundancy problem was considered far more important. Today, however, and in the near future the increase in multicast traffic generated by applications will cause the first problem, i.e., lack of true multicast, to become an important problem as well.

The LNNI portion of LANE Version 2.0 addresses these issues by providing a means of offloading the multicast traffic from the BUS. With reference to FIG. 3, this is achieved by the addition of one or more Selective Multicast Servers (SMSs) 48 that are responsible for handling multicast traffic.

Selective Multicast Server

A standard prior art SMS (and BUS) is constructed to perform the following functions. SMSs are designed to forward traffic on a packet level as opposed to forwarding traffic on a cell level. SMSs utilize a heavy protocol known as Server Cache Synchronization Protocol (SCSP). In LNNI most of the information between entities, i.e., LES, SMS, LECS, is transferred using this protocol. This protocol is needed to enable the SMS and LES to reside on difference network devices. In addition, SMSs introduce themselves to the LECS and after obtaining the LES(s) from the LECS. After this first introduction they introduce themselves again to the LES(s). Further, SMSs must forward multicast traffic to the BUS to ensure backward compatibility with non-SMS enabled LECs.

Both the BUS and SMS comprise, among other things, a segmentation and re-assembly (SAR) unit. As described above, a major function of the SMS is to receive and distribute multicast traffic.

In operation, one or more LECs establish connections to the BUS. Cells forwarded to the BUS from one or more LECs are received and input to the SAR. A re-assembly unit functions to reassemble the cells into packets. The cells are not forwarded until all cells comprising a packet are received. The BUS cannot multiplex different multicast traffic streams on the cell level, thus the requirement for an SAR in prior art BUS entities. It can, however, multiplex on the packet level.

Once all cells making up a packet have arrived, the packet is then segmented into cells and distributed to each receiver, i.e., member, in the particular multicast group associated with the packet.

For traditional LAN traffic, AAL5 is the means used by which Ethernet and Token Ring frames are encapsulated into ATM cells. AAL5, however, does not provide any multiplexing capabilities. This means that cells derived from a particular frame are queued until all have arrived at the SAR before the packet is passed to the segmentation unit and transmitted as cells to the plurality of multicast destinations, i.e., receivers.

Note that in practice, the BUS (and SMS) may be implemented in various devices but typically, it is implemented in ATM switches. More than one BUS and SMS may reside in a network with each BUS and SMS residing on a different switch.

Initially, the LEC requests from the LES a destination for sending multicast traffic. The LES responds with the address of an SMS. The SMS maintains a list of Multicast Media Access Control (MMAC) addresses, wherein each MMAC represents a multicast group. It is possible that several SMSs serve the same MMAC so as to provide load balancing in the event the output demand exceeds any one SMS.

The LESs have knowledge of the locations of the SMSs and the MMACs handled by each. When an LE_ARP_REQ message arrives at a LES from a LEC for a particular MMAC, the LES replies with the ATM address of the BUS (SMS). If the LES does not know about any SMSs, it sends the LEC the ATM address of the BUS. Thus, the BUS is the default in the event an SMS cannot be assigned.

In a network with multicast, the sending and receiving functions are independent of each other. In other words multicast connections may involve overlapping LECs or they may involve totally non overlapping LECs. The same LEC may function as a sender and a receiver for a single multicast connection or for multiple multicast connections.

Once the LEC obtains the ATM address of the SMS, it establishes a point to point connection to the SMS. The LEC then sends multicast traffic to the SMS over that connection.

By default, the LEC receives all multicast traffic. In some cases, e.g., LANE Version 2.0 or a LEC in selective multicast mode, the LEC must issue an LE_REGISTER_REQ message for a particular MMAC and send it to the LES in order to listen to a particular multicast. The LES, using the LNNI SCSP protocol, instructs the SMS to add the LEC to the point to multipoint connection.

IGMP Snooping

Routers utilize a protocol known as Internet Group Management Protocol (IGMP) that is used to enable a layer 3 device, i.e. router, to learn which interfaces to forward multicast traffic to for each multicast group. The IGMP protocol is useful to prevent flooding, i.e., broadcasting, multicast traffic to all ports which is normally done in the absence of such a mechanism. A layer 2 switch adapted to run IGMP snooping, functions to snoop the traffic, i.e., examine the conversations occurring between hosts and routers, including queries and responses, to learn which ports to send multicast traffic to.

In particular, routers use IGMP to ask hosts which multicasts they wish to receive. Hosts use IGMP to inform routers which multicasts they wish to receive. When a switch is placed between a host and a router, it can see which port a router is connected to and which ports have devices connected to them that wish to receive multicast traffic. Using this data, a switch can configure its forwarding database to send multicast traffic to the ports connected to hosts that want to receive the multicast traffic. Multicast traffic is not sent to ports that do not have a device connected to it that want to receive the multicast data.

Routers that support IGMP send out messages on a periodic basis that query which hosts want to receive multicast traffic. If a host is switched off, then the replies from that host to these messages will stop. The router uses the cessation of replies as an indication that the host does not wish to continue to receive multicast traffic. Hosts can also use an explicit leave message to indicate that they do not wish to listen to a multicast group.

Internet Group Management Protocol (IGMP) snooping functions to look at the conversations that occur between hosts and routers. In particular, IGMP snooping functions to track (1) the request for multicast traffic by a host, (2) the cessation of replies when a host is switched off and (3) the explicit host leave group message. If all hosts on a particular port do not wish to receive particular multicast traffic, then that port is removed from the set of ports to which that particular multicast traffic is forwarded.

Note that IGMP messages generated by hosts comprise requests for specific multicasts. IGMP snooping examines the multicast that is being requested and either enables or disables forwarding of that particular multicast. Examining the multicast address in messages sent from the host enables IGMP snooping to provide automatic fine tune control that directs only the requested multicast traffic to the host rather than all the multicast traffic.

A limitation of IGMP snooping, however, is that it can only be used with IP multicast traffic and cannot be used with non-IP multicast traffic. Although the majority of multicast traffic in use today is IP multicast traffic, there is a growing amount of multicast traffic that is non-IP related. Thus, IGMP cannot be used to prevent flooding of multicast traffic to all ports. This is the situation in LANE Version 1.0 wherein all multicast traffic is broadcast to all the LECs via the BUS. As described hereinabove, LANE Version 2.0 introduced SMS which works with layer 2 MMAC addresses only.

LE Multicast Registration

Figure 4:
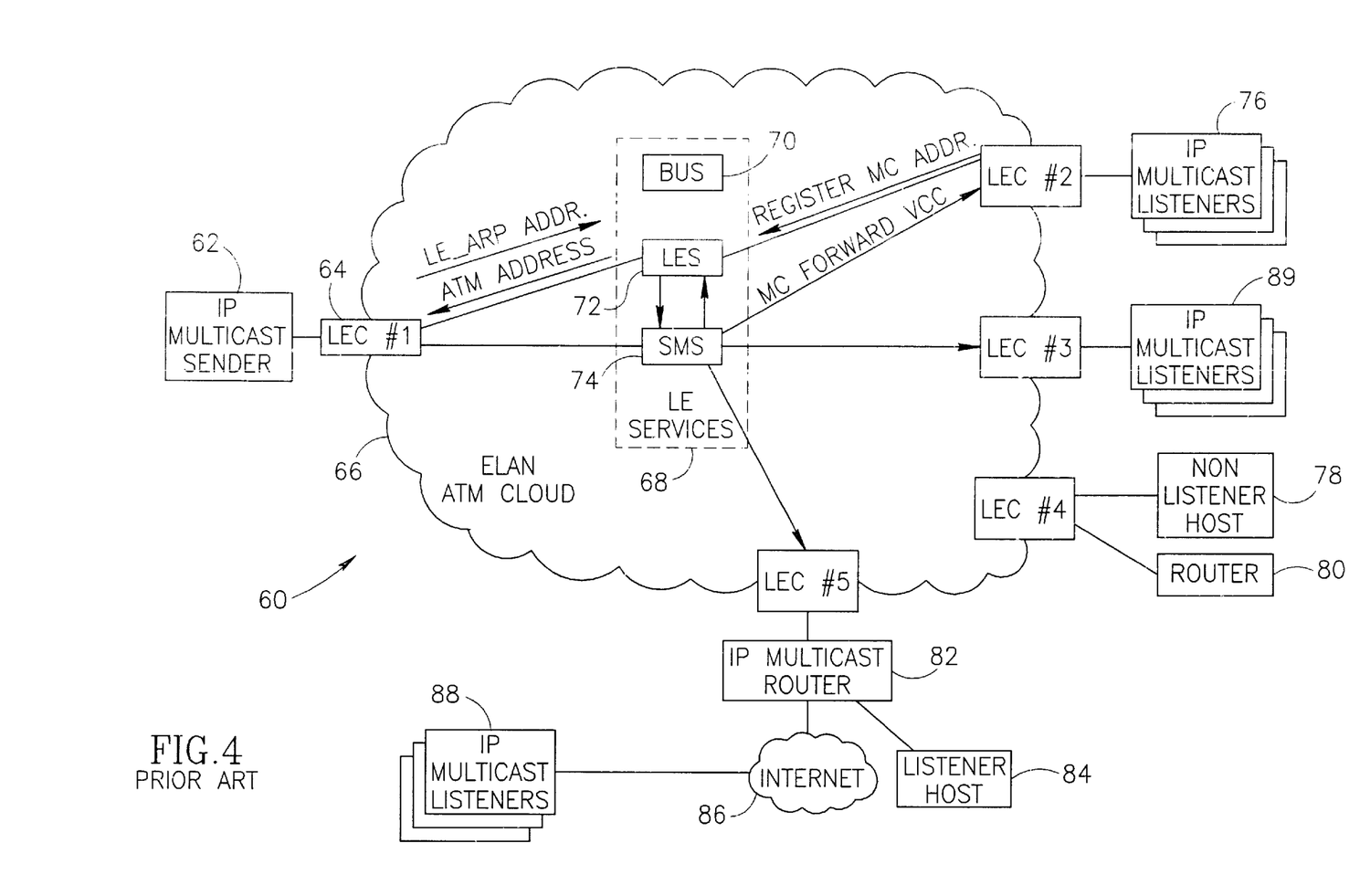
FIG. 4 is a block diagram illustrating an example prior art ELAN including several LECs connected to an IP multicast sender and a plurality of IP multicast listeners.

A block diagram illustrating an example prior art ELAN including several LECs connected to an IP multicast sender and a plurality of IP multicast listeners is shown in FIG. 4. The network, generally referenced 60, comprises an ELAN 66 configured over an ATM cloud. The ELAN 66 comprises LE services 68 including BUS 70, LES 72 and SMS 74. The ELAN also comprises a plurality of LECs 64, labeled LEC #1 through LEC #5. An IP multicast sender 62 is coupled to LEC #1 while one or more IP multicast listeners 76 are coupled to LEC #2, one or more IP multicast listeners 89 to LEC #3, non listener host 78 and non IP multicast router 80 to LEC #4 and IP multicast router 82 to LEC #5. The IP multicast router 82 is connected to listener host 84 and the Internet 86. One or more IP multicast listeners 88 are configured to receive multicast traffic from the ELAN via IP multicast router 82 and the Internet 86.

As described previously, network traffic can be classified into three basic types of traffic: unicast traffic, broadcast traffic and multicast traffic. Unicast traffic includes data sent from a source host to a single destination host. In broadcast traffic, data is sent from a source host destined to all hosts on a specific subnet. With multicast traffic, data is sent from a source host to a group of destination hosts. In ATM ELANs, the destination hosts are identified using a registration procedure as described in the ATM Forum LANE standards, as hosts desiring to be listeners to a particular source of multicast traffic join and become members of a specific multicast group.

Multicast traffic may be generated by numerous types of applications such as a video conferencing application whereby an audio/video stream is transmitted to a group of participating stations, each configured to listen to and view the transmission. Multicast listener stations may be geographically dispersed and connected to different physical networks. All the stations, however, belong to the same multicast group and are configured to listen to the same multicast traffic.

Both the Institute of Electrical and Electronic Engineers (IEEE) and the Internet Engineering Task Force (IETF) have defined several control protocols for IP multicast traffic. These control protocols permit the communication of data, parameters, configuration data, etc. that is required for correct, efficient and secure multicast traffic flow. The Internet Group Management Protocol (IGMP) and Generic Multicast Registration Protocol (GMRP) are examples of multicast control protocols that support multicast traffic within a subnet. These protocols support activities such as the registration of multicast host listeners for participation in a multicast group, the unregistration of a multicast host listener from a multicast group, the response to queries from routers about multicast host listeners within a subnet, communication of information between neighboring bridges, etc.

In addition, the following protocols are examples of IP multicast control protocols that support the exchange of information in an inter-network context: Distance Vector Multicast Router Protocol (DVMRP), Multicast Open Shortest Path First (MOSPF) and Protocol Independent Multicast (PIM). These protocols support, among other things, the identification of multicast routers by neighboring multicast routers, the communication of multicast routing tables among neighboring routers and the definition of the multicast routing tree per multicast group.

Multicast control protocols, such as those described hereinabove, provide the basic mechanism enabling the forwarding of multicast traffic. The forwarding of multicast data means sending the data to all the hosts that want to listen to a particular multicast traffic group. Thus, multicast traffic data must be forwarded to all subnets that have a multicast host wishing to listen to that particular multicast traffic. In addition, in forwarding the multicast traffic, it is important to point out that the multicast traffic is not forwarded to networks where there are not situated any listeners to that multicast traffic.

A multicast enabled router device is configured to forward multicast frames towards its network interfaces based on the multicast entries in its routing table. Similarly, a multicast enabled Layer 2 bridge or switch device is configured to forward multicast frames towards the subnets in accordance with the multicast entries in its forwarding table. In general, a multicast enabled router is configured to forward multicast frames towards its multicast neighbors and to Layer 2 LANs that have at least one listener of the multicast traffic.

Once a multicast data frame is forwarded within a legacy subnet LAN segment (e.g., Ethernet, Token Ring, FDDI, etc.) that is based on a connection-less oriented infrastructure, the multicast frame arrives at each device that is physically connected to the network. Each device, in turn, determines how to process the multicast frame. For example, a multicast enabled NIC in a host device forwards the multicast frame to its host if there is an application configured to listen to the multicast traffic from that particular multicast group. If no application is configured to listen to the traffic, the NIC discards the multicast frame.

In order to support multicast traffic over ATM based ELANs, a specific functionality has been defined for LANE components (i.e., LECs and LE services components). Multicast support over ATM ELANs is defined in several standards of the ATM Forum, including LUNI v2.0 (af-lane-0084.000 July 1997 and LNNI v2.0 (af-lane-0112.000 February 1999), both of which are incorporated by reference in their entirety.

These standards provide a mechanism whereby a multicast listener can register, via the LEC serving the particular host, a multicast MAC address in the LES, indicating its desire to join a particular multicast traffic group of listeners. Similarly, a multicast listener, via the LEC serving that particular host, can unregister a multicast MAC address in the LES, indicating its desire to leave a particular multicast traffic group of listeners.

The information related to multicast listeners is communicated by the LES to the appropriate SMS entity. The SMS entity is responsible to efficiently distribute multicast traffic to the group of listening LECs utilizing point to multipoint VCCs. The LECs that do not register to listen to that particular multicast traffic group do not receive the multicast traffic flow on the ELAN.

An illustration of the multicast registration process is presented with reference to FIG. 4. The sending LEC #1, in response to the IP multicast sender, sends an LE_ARP request message containing the multicast address of the multicast group to the LES 72 in the LE Service block 68. The LES, in response, returns the ATM address of the SMS 74. The listening LEC #2, in response to a request by one or more IP multicast listeners 76, sends a register message to the LES containing the multicast address of the group the listener desired to join. In response, the LES forwards the request to the SMS that adds the listener to the multicast forward point to multipoint VCC. The SMS uses the multicast forward point to multipoint VCC to forward the multicast traffic for a particular group to all registered listeners.

A limitation of the listener registration process described above as provided by the current ATM Forum standards is that the registration request process is only able to handle a single multicast address per request message. Thus, for each multicast group a listener desires to listen to, a separate individual request message must be generated and sent by the LEC to the LES. The LANE version 2.0 standards do not provide a mechanism whereby a LEC can register to receive more than a single multicast traffic flow in a single request message.

This limitation is particularly problematic in the case where a LEC is serving a multicast enabled router. In this case, it is required that all multicast traffic be forwarded to the LEC so as to enable the router to forward the multicast traffic to other subnets. Note that the multicast traffic will reach the LEC if it was sent via the BUS entity, as is the case in LANE v1.0. The multicast traffic will not reach the LEC, however, if it is sent through the SMS, as is the case with LANE v2.0.

As another example, this limitation is also problematic in applications whereby a LEC serves a security type multicast application wherein it is desired to probe all multicast traffic flowing over the ATM ELAN.

Currently, LANE v2.0 does not provide a mechanism whereby a LEC can register to receive all multicast traffic flowing over the ATM ELAN via a single message. One alternative to achieve the functionality specified in the current standard, is to register each possible multicast MAC address. This, however, is highly inefficient and not practical due to the huge range of legal multicast MAC addresses. Thus, it is desirable to have a mechanism whereby a LEC can register in a single request message to receive all multicast flows in an ATM ELAN.

SUMMARY OF THE INVENTION

The present invention solves the problems associated with the prior art by providing an apparatus for and a method of implementing multicast registration in an ATM based ELAN. In particular, the present invention provides a mechanism for a LEC to register to receive all multicast group traffic flows. The mechanism provides the means for requesting all multicast traffic to be forwarded to the requesting LEC without requiring the LEC to generate a separate request for each multicast MAC address. The mechanism of the present invention provides means for a LEC to register to receive all multicast flows by defining an 'all_multicast' TLV and including this TLV in the request message sent by the LEC. Further, the 'all_multicast' designation is also used to forward multicast traffic over the ELAN to requesting LECs.

In operation, the LEC, LES and SMS are modified to perform the multicast registration/unregistration method of the present invention. The LEC generates the LE_REGISTER_REQUEST message and includes the all_multicast TLV indicating that the LEC desires to receive all multicast traffic flows in the ELAN. The LES, upon receipt of such an all_multicast TLV, adds the LEC to its list of LECs to receive all multicast traffic and communicates the related information to each SMS. Each SMS is adapted to add the LEC to each of the multicast groups currently maintained by the SMS. In addition, upon the establishment of new multicast groups, the SMS is operative to automatically add the LEC to the multicast group.

A similar symmetric process occurs in the event a LEC no longer wishes to receive all multicast traffic. The LEC generates the LE_UNREGISTER_REQUEST message and includes the all_multicast TLV indicating that the LEC desires to stop receiving all multicast traffic flows in the ELAN. The LES removes the LEC from its list of LECs to receive all multicast traffic and forwards the related LEC information to each SMS. The SMS is operative to remove the LEC from each of the multicast groups regardless of whether the LEC did not register to be a listener to that group using the specific register mechanism of the standard LANE protocol.

There is thus provided in accordance with the present invention, in an Asynchronous Transfer Mode (ATM) based Emulated LAN (ELAN) including LAN Emulation Server (LES) and Selective Multicast Service (SMS) LE Services and one or more LE Clients (LECs), a method of multicast registration, the method comprising the steps of generating a register request message comprising an indication that a requesting LEC desires to receive all multicast flows in the ELAN, communicating the request to receive all multicast flows to all SMS entities in the ELAN and adding the requesting LEC to all multicast forward groups in each SMS entity so as to cause all multicast flows in the ELAN to be received by the requesting LEC.

There is also provided in accordance with the present invention, in an Asynchronous Transfer Mode (ATM) based Emulated LAN (ELAN) including LAN Emulation Server (LES) and Selective Multicast Service (SMS) LE Services and one or more LE Clients (LECs), a method of multicast unregistration, the method comprising the steps of generating an unregister request message comprising an indication that a requesting LEC desires to stop receiving all multicast flows in the ELAN, communicating the request to stop receiving all multicast flows to all SMS entities in the ELAN and removing the requesting LEC from all multicast forward groups in each SMS entity so as to cause all multicast flows in the ELAN to stop being received by the requesting LEC.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AAL | ATM Adaptation Layer |
| ANSI | American National Standards Institute |
| ARP | Address resolution Protocol |
| ATM | Asynchronous Transfer Mode |
| BUS | Broadcast and Unknown Server |
| CCITT | Comite Consulatif International Telegraphique et Telephonique |
| DVMRP | Distance Vector Multicast Router Protocol |
| ELAN | Emulated Local Area Network |
| FDDI | Fiber Distributed Data Interface |
| GMRP | Generic Multicast Registration Protocol |
| IEEE | Institute of Electrical and Electronic Engineers |
| IETF | Internet Engineering Task Force |
| IGMP | Internet Group Management Protocol |
| IISP | Interim Inter-Switch Signaling Protocol |
| IP | Internet Protocol |

-continued

| Term | Definition |
|---|---|
| IPX | Internetwork Packet Exchange |
| ITU | International Telecommunications Union |
| LAN | Local Area Network |
| LANE | LAN Emulation |
| LE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MMAC | Multicast Media Access Control |
| MOSPF | Multicast Open Shortest Path First |
| P2M | Point-to-Multipoint |
| P2P | Point-to-Point |
| PIM | Protocol Independent Multicast |
| PNNI | Private Network to Network Interface |
| PVC | Permanent Virtual Circuit |
| SAR | Segmentation and Reassembly |
| SCSP | Server Cache Synchronization Protocol |
| SMS | Selective Multicast Server |
| SVC | Switched Virtual Circuit |
| TLV | Type, Length, Value |
| UNI | User to Network Interface |
| VCC | Virtual Channel Connection |

General Description

The present invention provides an apparatus for and a method of multicast registration in an ATM based ELAN. In particular, the present invention provides a mechanism for a LEC to register to receive all multicast group traffic flows. The mechanism provides the means for requesting all multicast traffic to be forwarded to the requesting LEC without requiring the LEC to generate a separate request for each possible multicast MAC address. The mechanism of the present invention provides means for a LEC to register to receive all multicast flows by making an 'all_multicast' designation in the request message sent by the LEC. Further, the 'all_multicast' designation is also used to forward multicast traffic over the ELAN to requesting LECs.

Figure 5:
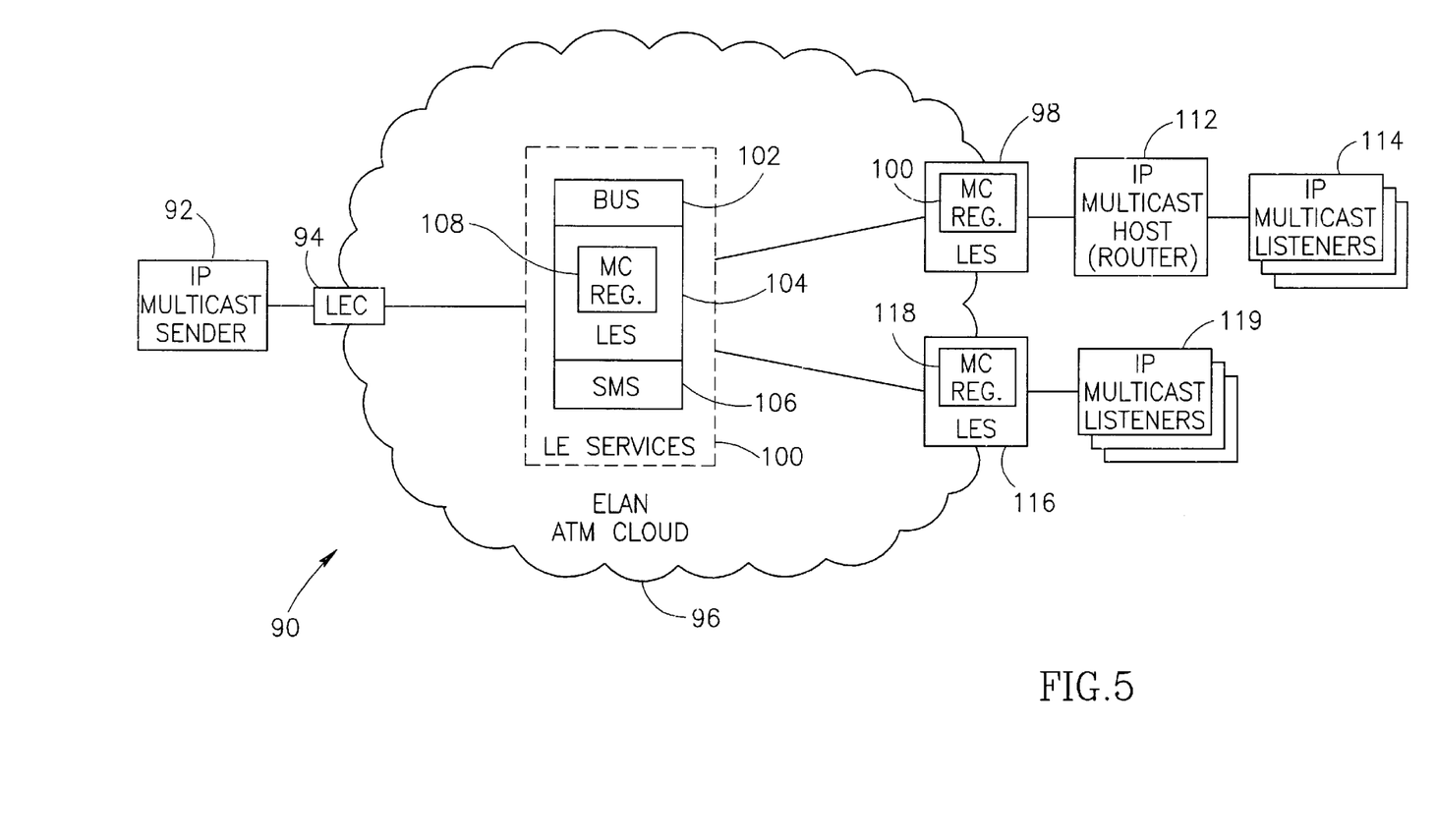
FIG. 5 is an example ELAN incorporating a LES and LECs constructed to perform the multicast registration method of the present invention.

An example ELAN incorporating a LES and LECs adapted to perform the multicast registration method of the present invention is shown in FIG. 5. The network, generally referenced 90, comprises an ELAN 96 constructed over an ATM cloud, a sending LEC 94 and two listening LECs 98, 116. An IP multicast sender 92 is connected to the sending LEC 94. An IP multicast router 112 is connected to listening LEC 98 while one or more IP multicast listeners 119 are connected to listening LEC 116. One or more IP multicast listeners 114 are connected to IP multicast router 112. The ELAN comprises LE services 100 including BUS entity 102, LES entity 104 and SMS entity 106.

In accordance with the present invention, the LES 104 is adapted to perform the LES portion of the multicast registration method of the present invention as indicated by the MC REG. (multicast registration) block 108. Similarly, the listening LECs 98, 116 are adapted to perform the LEC portion of the multicast registration method of the present invention as indicated by the MC REG. (multicast registration) blocks 110, 118, respectively.

In accordance with the present invention the multicast registration mechanism may be implemented statically or dynamically. In the static mechanism implementation, the LES is directly configured with the necessary information of all the LECs that wish to receive all multicast traffic flows. The information may include LEC_IDs for identifying the LECs to receive all multicast traffic flows. The information configured in the LES is required to uniquely identify the LEC on the ELAN and may comprise, for example, the LEC ATM address or the LEC_ID.

Note that in the static implementation, unregistering a LEC from receiving all multicast traffic flows is also performed statically in the LES.

In the dynamic mechanism implementation, a LEC is configured to dynamically register its desire to receive all multicast traffic flows with the LES. In addition, the LEC is configured to dynamically unregister with the LES its desire to stop receiving all multicast traffic flows. In accordance with the present invention, the dynamic registration/unregistration mechanism extends the behavior of the LEC and LES as defined in the ATM Forum LANE v2.0 standard.

In order to enable the dynamic registration and unregistration of all multicast traffic flows in the ELAN, the present invention defines a new Type, Length, Value (or TLV) as shown below in Table 1.

TABLE 1

All_Multicast TLV

| TLV Name | Type | Length | Value |
|---|---|---|---|
| All_Multicast | 00-A0-3E-A0 | 2 | 1. LEC_ID of a LEC serving a multicast device on this ELAN.<br>2. LEC_ID = 0 indicates the current LEC. |

The format of the TLV is as defined in the LUNI v2.0 standard (in particular Annex A) and is configured to include the TLV name 'All_Multicast' having a type '00-A0-3E-A0' (Hex), a length of two bytes and a value as defined above in Table 1. The type can be any type that is not currently defined by the LUNI standard in Annex A. The type presented above in is one example of a possible value for the type field. The contents of the value field are adapted to comprise information identifying the LEC requesting to receive all multicast traffic flows such as the LEC_ID. Note that if the ATM address of the LEC is used, than the TLV Length field comprises 20 bytes. The LEC is typically connected to a multicast enabled device such as an IP multicast enabled router. The current LEC, i.e., the LEC generating the TLV, may be indicated by setting the value field to a LEC_ID of zero. In this case, the requesting LEC is identified by the REQUESTER-LECID field of the registration frame itself. It is appreciated that one skilled in the networking arts can utilize means other than the TLV presented above to indicate to the LES, the desire of a LEC to receive all multicast traffic flows.

In accordance with the present invention, the All_Multicast TLV is generated and sent as part of the following LAN Emulation control messages:

1. LE_REGISTER_REQUEST message
2. LE_REGISTER_RESPONSE message
3. LE_UNREGISTER_REQUEST message
4. LE_UNREGISTER_RESPONSE message The mechanism of sending TLVs such as the TLV shown above in Table 1 in the LAN Emulation control messages listed above is described in detail in the LUNI v2.0 standard SECTIONS 4 and 6, incorporated herein by reference. The standard specifies that the TLVs sent in the above types of messages be appended from byte offset 108 (see LUNI v2.0 standard Table 28—Registration Frame Format). Note that the SOURCE-LAN-DESTINATION field is left unassigned since the traffic from all multicast groups is desired.

The process of how a switch or other network device learns about multicast capable devices will know be described. A Layer 2 switch may implement what is commonly known as IGMP snooping to learn about the listening hosts and multicast routers located on the LAN. The switch 'snoops' by listening to IGMP messages, including queries, reports and leave messages, as well as by listening to multicast inter-router protocol messages, such as DVMRP, MOSPF and PIM protocol messages. Through snooping, a Layer 2 switch can learn for each of its ports, where the listeners of the multicast groups are located and where the multicast routers are located.

The Layer 2 switch may implement IGMP snooping on its LANs. For example, it can be implemented on Ethernet LANs as well as ATM emulated LANs. The use of IGMP snooping permits identification of listeners and routers on any of the ports of the switch, including Ethernet ports or ATM ports that are accessed through the internal LECs. Using the knowledge attained by the switch, the switch learns how to forward multicast traffic that it receives. The switch forwards multicast traffic to ports where listeners to that group are located. It also forwards multicast traffic to ports where multicast routers are located. It will not, however, forward the traffic to any of the other ports. A Layer 2 switch with one or more ATM LANE interfaces, must specifically register its wish to get multicast data in order to correctly receive multicast traffic over the ELAN. Such a multicast registration is performed with the LES, as described in the ATM Forum LANE standard.

Thus, a switch identifying a multicast listener on one of its Ethernet ports, for example, would immediately register the corresponding multicast group with the LANE LES entity in order to allow multicast traffic to be received over the ELAN. The switch would then forward all multicast traffic received to the Ethernet port where the multicast listener is located. A switch identifying a multicast router on one of its Ethernet ports, for example, would immediately register the 'all-multicast' group with the LANE LES entity in order to allow all multicast traffic to be received over the ELAN. The switch would then forward all multicast traffic received to the Ethernet port where the multicast router is located.

Figure 6:
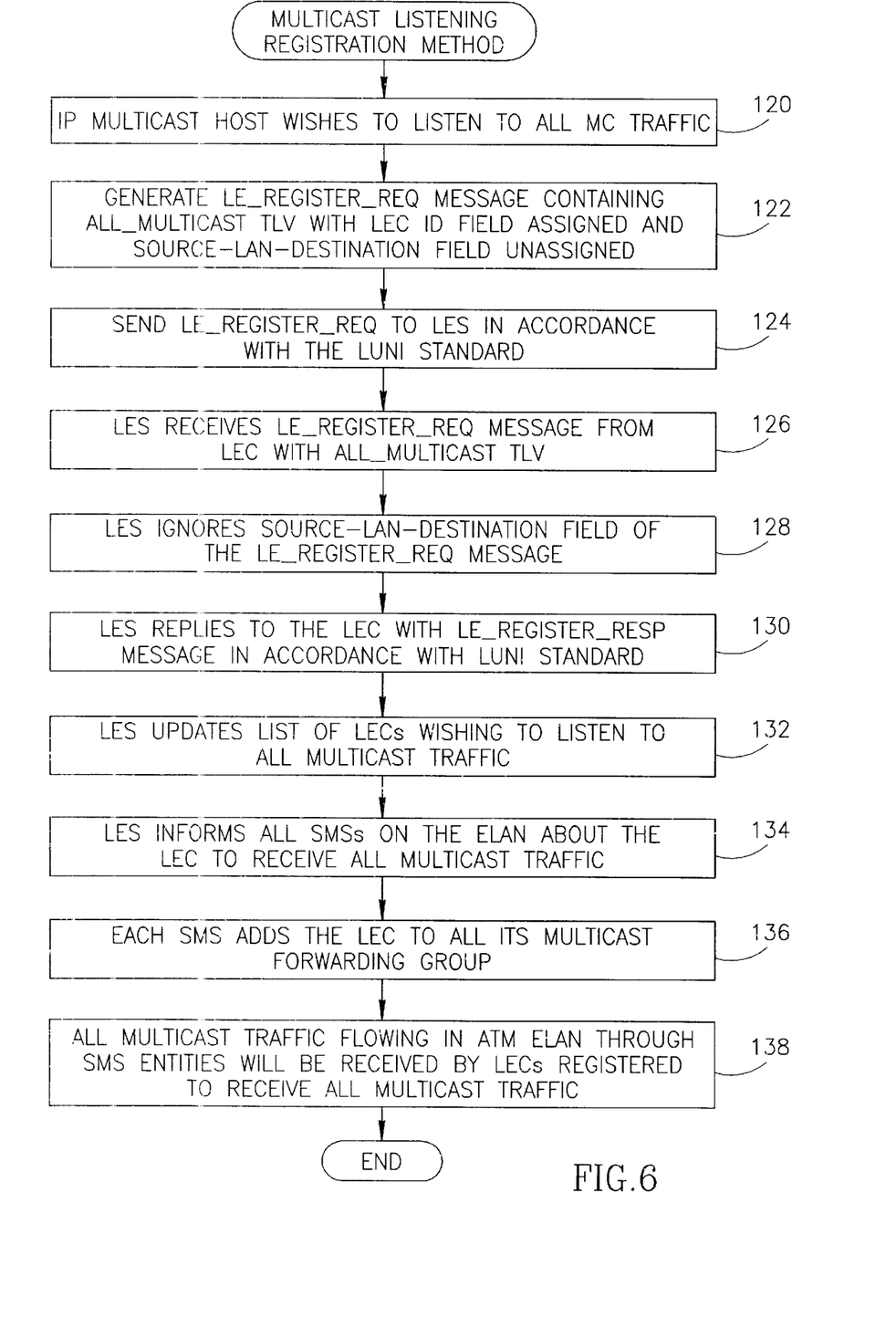
FIG. 6 is a flow diagram illustrating the multicast listening registration method of the present invention.

The registration method of the present invention will now be described in more detail. A flow diagram illustrating the multicast listening registration method of the present invention is shown in FIG. 6. The method is described with reference to the example ELAN illustrated in FIG. 5. A portion of this method is performed by the MC REG. means 108 in the LES 104 within the LE services 100 and a portion is performed by the MC REG. means 110 in the listening LEC 98. The SMS is also adapted in accordance with the present invention as described below. For illustration purposes, the method is described in the context of the listening LEC 98 and IP multicast router 112. Note, however, that the method applies to any listening LEC (e.g., LEC 116) and LES adapted to perform the multicast registration method of the present invention.

Note that in connection with the method of the present invention, it is irrelevant whether the sending LEC 94 has registered with the LES 104 in response to a request by the IP multicast sender 92.

Initially, the listening LEC 98 learns that its multicast enabled host, e.g., IP multicast router 112, desires to listen to all multicast traffic flows (step 120). In response, the listening LEC generates an LE_REGISTER_REQUEST message comprising the All_Multicast TLV as defined above in Table 1 (step 122). The TLV is generated to comprise the LEC_ID of the listening LEC 98 serving the multicast enabled network entity (i.e., the IP multicast router 112). The SOURCE-LAN-DESTINATION field is left unassigned (i.e., set to value '00') since the traffic from all multicast groups is desired.

The LE_REGISTER_REQUEST message is sent to the LES in accordance with the LUNI standard (step 124). For example, the LUNI standard defines the time during which the LEC may transmit the LE_REGISTER_REQUEST message. The LES 104 receives the LE_REGISTER_REQUEST message containing the All_Multicast TLV from the LEC 98 and uses the TLV to learn that the LEC desires to receive all multicast traffic flows on the ATM ELAN (step 126). The LES is adapted to ignore the SOURCE-LAN-DESTINATION field of the LE_REGISTER_REQUEST message since no one particular multicast MAC address is specified (step 128). The LES then replies to the LEC with a LE_REGISTER_RESPONSE message in accordance with the LUNI standard (step 130).

Upon registration of the All_Multicast TLV information in the LES, the LES in response is operative to update its list of LECs that desire to listen to all multicast traffic flows (step 132). Upon identifying a new LEC to receive all multicast traffic flows, the LES communicates related information about the LEC to the one or more SMS entities on the ELAN using any suitable form of communications (step 134). Note that any means of communication between the LES and SMS is suitable for use with the present invention, for example, the LNNI protocol defined by the ATM Forum.

Each SMS, in turn, is operative to add the LEC to all its multicast forwarding groups (step 136). Each SMS is operative to maintain two types of registrations for each multicast group: (1) a specific LEC registration and (2) an 'all_multicast' registration. The database or table used by the SMS is adapted to track both types of registrations. The SMS is operative to add the LEC using the 'all_multicast' registration type to all multicast groups regardless of whether the LEC is currently a member of one or more groups.

Each SMS is operative to add each listening LEC to all multicast forward VCCs. As part of its normal function, each SMS maintains one or more point to multipoint multicast forward VCCs. Each SMS functions to add the listening LEC to each of the point to multipoint multicast forward VCCs if it is not already in the group in connection with a specific type registration. In this manner, the multicast traffic flowing in the ATM ELAN through the SMS entities will be received by all the LECs that specifically registered to receive all multicast traffic flows (step 138).

Figure 7:
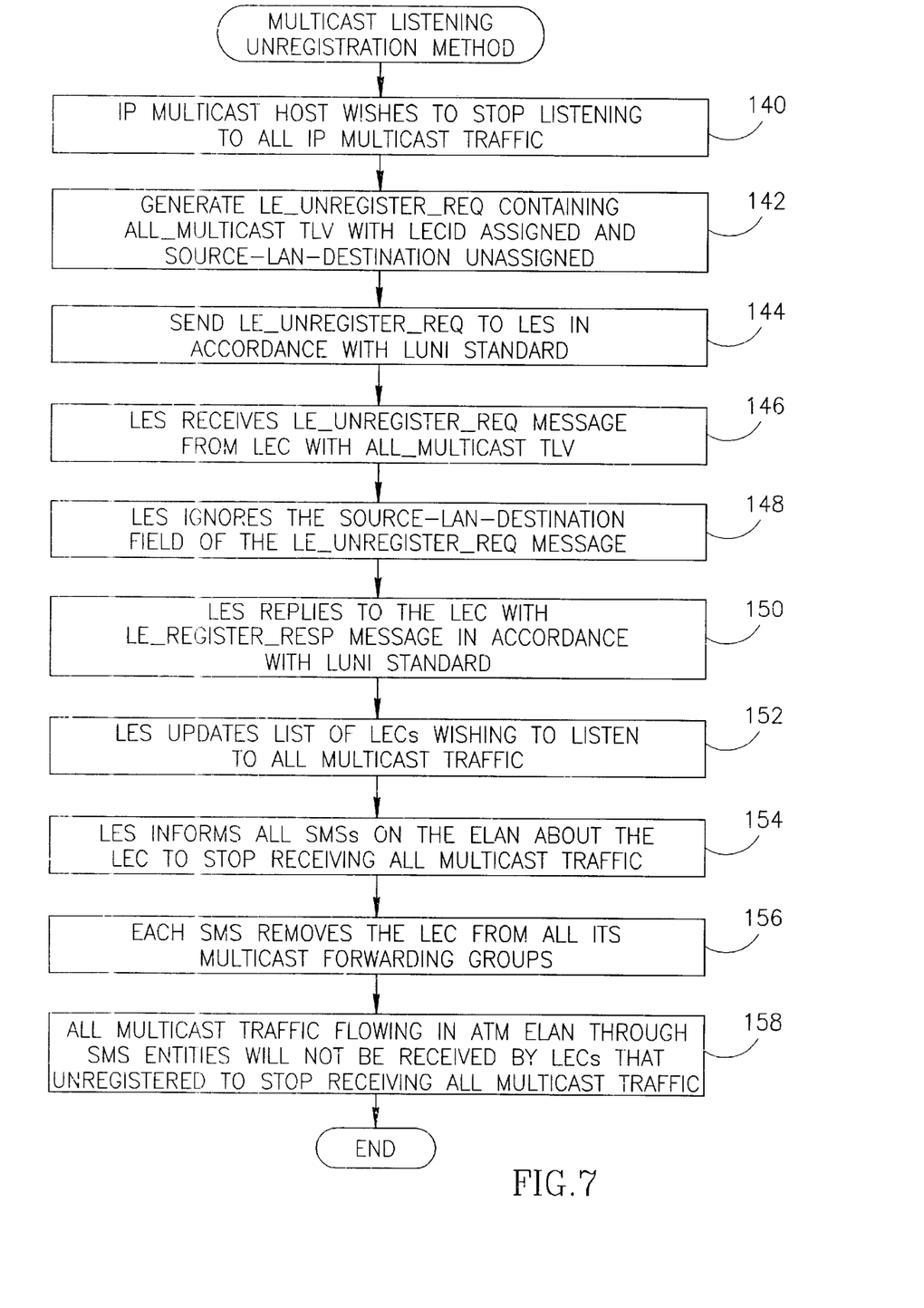
FIG. 7 is a flow diagram illustrating the multicast listening unregistration method of the present invention.

The unregistration method of the present invention will now be described in more detail. A flow diagram illustrating the multicast listening unregistration method of the present invention is shown in FIG. 7. The method is described with reference to the example ELAN illustrated in FIG. 5. A portion of this method is performed by the MC REG. means 108 in the LES 104 within the LE services 100 and a portion is performed by the MC REG. means 110 in the listening LEC 98. For illustration purposes, the method is described in the listening LEC 98 and IP multicast router 112. Note, however, that the method applies to any listening LEC (e.g., LEC 116) and LES adapted to perform the multicast registration method of the present invention.

Initially, the listening LEC 98 learns that its multicast enabled host, e.g., IP multicast router 112, stopped listening to multicast traffic flows (step 140). Note that typically, a multicast router listens to all multicast traffic. It may stop listening if it is no longer enabled, is no longer connected or for some other reason stops listening. In response, the listening LEC generates an LE_UNREGISTER_REQUEST message comprising the All_Multicast TLV as defined above in Table 1 (step 142). The TLV is generated to comprise the LEC_ID of the listening LEC 98 serving the multicast enabled network entity (i.e., the IP multicast router 112). The SOURCE-LAN-DESTINATION field is left unassigned (i.e., set to value '00') since it is desired to stop receiving traffic from all multicast groups.

The LE_UNREGISTER_REQUEST message is sent to the LES in accordance with the LUNI standard (step 144). For example, the LUNI standard defines the time during which the LEC may transmit the LE_UNREGISTER_REQUEST message. The LES 104 receives the LE_UNREGISTER_REQUEST message containing the All_Multicast TLV from the LEC 98 and uses the TLV to learn that the LEC desires to stop receiving all multicast traffic flows on the ATM ELAN (step 146). The LES is adapted to ignore the SOURCE-LAN-DESTINATION field of the LE_REGISTER_REQUEST message since no one particular multicast MAC address is specified (step 148). The LES then replies to the LEC with a LE_UNREGISTER_RESPONSE message in accordance with the LUNI standard (step 150).

Upon unregistration of the All_Multicast TLV information in the LES, the LES in response is operative to update its list of LECs that desire to stop listening to all multicast traffic flows (step 152). Upon identifying a LEC to stop receiving all multicast traffic flows, the LES communicates related information about the LEC to the one or more SMS entities on the ELAN (step 154). Note that any suitable means of communication between the LES and SMS is suitable for use with the present invention, for example, the LNNI protocol defined by the ATM Forum.

Each SMS, in turn, is operative to remove the LEC from all its multicast forwarding groups (step 156). As described previously, each SMS is operative to maintain two types of registrations for each multicast group: (1) a specific LEC registration and (2) an 'all_multicast' registration. The database or table used by the SMS is adapted to track both types of registrations. The SMS is operative to remove all the 'all_multicast' type registrations regardless of whether the LEC is currently a member of one or more groups. If a LEC was previously registered for a particular group using a specific type registration, it remains after the all_multicast registration is removed.

As part of its normal function, each SMS maintains one or more point to multipoint multicast forward VCCs. Each SMS functions to remove the listening LEC from each point to multipoint multicast forward VCC associated with a group that the LEC did not previously register for. In this manner, the multicast traffic flowing in the ATM ELAN through the SMS entities will not be received by all the LECs that specifically registered to stop receiving all multicast traffic flows (step 158).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. In an Asynchronous Transfer Mode (ATM) based Emulated LAN (ELAN) including LAN Emulation Server (LES) and Selective Multicast Service (SMS) LE Services and one or more LE Clients (LECs), a method of multicast registration, said method comprising the steps of:
   generating a register request message comprising an indication that a requesting LEC desires to receive all multicast flows in said ELAN;
   communicating said request to receive all multicast flows to all SMS entities in said ELAN; and
   adding said requesting LEC to all multicast forward groups in each SMS entity so as to cause all multicast flows in said ELAN to be received by said requesting LEC.

2. The method according to claim 1, further comprising the step of adding said requesting LEC to a list of LECs maintained by said LES to receive all multicast flows in said ELAN.

3. The method according to claim 1, wherein said indication comprises an All_Multicast Type, Length, Value (TLV).

4. The method according to claim 1, wherein said indication comprises an All_Multicast Type, Length, Value (TLV) having a value adapted to uniquely identify said requesting LEC.

5. The method according to claim 4, wherein said value comprises a LEC_ID.

6. The method according to claim 4, wherein said value comprises an ATM address of said requesting LEC.

7. The method according to claim 4, wherein said value is set equal to zero to indicate the current LEC.

8. The method according to claim 1, wherein said register request message comprises a SOURCE-LAN-DESTINATION field that is unassigned.

9. The method according to claim 1, wherein said register request message comprises an LE_REGISTER_REQUEST message generated and sent in accordance with the ATM Forum LAN Emulation User to Network Interface (LUNI) standard.

10. The method according to claim 1, further comprising the step of generating and sending a register response message to said requesting LEC.

11. The method according to claim 1, further comprising the step of generating and sending an LE_REGISTER_RESPONSE message in accordance with the ATM Forum LAN Emulation User to Network Interface (LUNI) standard.

12. The method according to claim 1, wherein said requesting LEC is connected to an IP Multicast enabled router.

13. The method according to claim 1, further comprising the step of performing Internet Group Management Protocol (IGMP) snooping on traffic in said ELAN so as to detect the presence of IP multicast enabled network devices in said ELAN.

14. The method according to claim 1, wherein said SMS maintains a specific registration type and an all_multicast registration type, wherein said requesting LEC is added to all multicast forward groups in each SMS entity using said all_multicast registration type regardless of whether it was previously registered using a specific registration type.

15. In an Asynchronous Transfer Mode (ATM) based Emulated LAN (ELAN) including LAN Emulation Server (LES) and Selective Multicast Service (SMS) LE Services and one or more LE Clients (LECs), a method of multicast unregistration, said method comprising the steps of:
   generating an unregister request message comprising an indication that a requesting LEC desires to stop receiving all multicast flows in said ELAN;

communicating said request to stop receiving all multicast flows to all SMS entities in said ELAN; and removing said requesting LEC from all multicast forward groups in each SMS entity so as to cause all multicast flows in said ELAN to stop being received by said requesting LEC.

16. The method according to claim 15, further comprising the step of removing said requesting LEC from a list of LECs maintained by said LES to receive all multicast flows in said ELAN.

17. The method according to claim 15, wherein said indication comprises an All_Multicast Type, Length, Value (TLV).

18. The method according to claim 15, wherein said indication comprises an All_Multicast Type, Length, Value (TLV) having a value adapted to uniquely identify said requesting LEC.

19. The method according to claim 18, wherein said value comprises a LEC_ID.

20. The method according to claim 18, wherein said value comprises an ATM address of said requesting LEC.

21. The method according to claim 18, wherein said value is set equal to zero to indicate the current LEC.

22. The method according to claim 15, wherein said unregister request message comprises a SOURCE-LAN-DESTINATION field that is unassigned.

23. The method according to claim 15, wherein said unregister request message comprises an LE_UNREGISTER_REQUEST message generated and sent in accordance with the ATM Forum LAN Emulation User to Network Interface (LUNI) standard.

24. The method according to claim 15, further comprising the step of generating and sending an unregister response message to said requesting LEC.

25. The method according to claim 15, further comprising the step of generating and sending an LE_UNREGISTER_RESPONSE message in accordance with the ATM Forum LAN Emulation User to Network Interface (LUNI) standard.

26. The method according to claim 15, wherein said requesting LEC is connected to an IP Multicast enabled router.

27. The method according to claim 15, further comprising the step of performing Internet Group Management Protocol (IGMP) snooping on traffic in said ELAN so as to detect the presence of IP multicast enabled network devices in said ELAN.

28. The method according to claim 15, wherein said SMS maintains a specific registration type and an all_multicast registration type, wherein all all_multicast type registrations associated with said requesting LEC are removed from all multicast forward groups in each SMS entity, and wherein specific type registrations previously made for said requesting LEC remain.

* * * * *